(12) United States Patent
Wang et al.

(10) Patent No.: US 12,448,276 B2
(45) Date of Patent: Oct. 21, 2025

(54) MEMS MICROPHONE INCLUDING A CROSS BEAM ASSEMBLY

(71) Applicant: AAC Kaitai Technologies (Wuhan) CO., LTD, China (CN)

(72) Inventors: Kaijie Wang, Shenzhen (CN); Bei Tong, Shenzhen (CN)

(73) Assignee: AAC Kaitai Technologies (Wuhan) CO., LTD, Wuhan (CN)

(*) Notice: Subject to any disclaimer, the term of this patent is extended or adjusted under 35 U.S.C. 154(b) by 672 days.

(21) Appl. No.: 17/833,917

(22) Filed: Jun. 7, 2022

(65) Prior Publication Data

US 2023/0192472 A1  Jun. 22, 2023

(30) Foreign Application Priority Data

Dec. 22, 2021 (CN) .......................... 202123253560.2

(51) Int. Cl.
*B81B 3/00* (2006.01)

(52) U.S. Cl.
CPC .......... *B81B 3/0021* (2013.01); *B81B 3/0094* (2013.01); *B81B 2201/0257* (2013.01); *B81B 2203/0127* (2013.01); *B81B 2203/0315* (2013.01); *B81B 2203/04* (2013.01)

(58) Field of Classification Search
CPC .................. B81B 1/002; B81B 3/0027; B81B 2203/0118; B81B 2203/0127; H04R 19/04
See application file for complete search history.

(56) References Cited

U.S. PATENT DOCUMENTS 12,187,597 B2 * 1/2025 Wang .................... B81B 3/0021

FOREIGN PATENT DOCUMENTS

CN         111225330 A  *  6/2020  ............. H04R 19/04

* cited by examiner

*Primary Examiner* — Sue A Purvis
*Assistant Examiner* — Seyon Ali-Simah Punchbeddell
(74) *Attorney, Agent, or Firm* — Wiersch Law Group

(57) ABSTRACT

A MEMS microphone includes a substrate having a back cavity, a vibration diaphragm system, and a housing. The vibration diaphragm system includes at least two sub-vibration diaphragm assemblies, a slit is formed between adjacent two of the at least two sub-vibration diaphragm assemblies, one end, distal from the housing, of each of the at least two sub-vibration diaphragm assemblies is fixed to a cross beam assembly, and first gaps are formed between the at least two sub-vibration diaphragm assemblies and inner sides of the housing, so that the at least two sub-vibration diaphragm assemblies form a cantilever beam structure, which increases compliance of the vibration diaphragm system and further improves sensitivity of microphones.

9 Claims, 4 Drawing Sheets

MEMS MICROPHONE INCLUDING A CROSS BEAM ASSEMBLY

TECHNICAL FIELD

The present disclosure relates to the field of electroacoustic conversion, and in particular to a MEMS microphone.

BACKGROUND

In recent years, Micro-Electro-Mechanical System (MEMS) microphones have been widely used in mobile phones, tablet computers, and smart wearable devices. The MEMS microphones have advantages of being small in size, resistant to high temperature, easy to mount, and so on. Compared with conventional MEMS microphones having single back plate electrode and double back plate electrodes, MEMS microphones having double vibration diaphragms better achieve waterproof and dustproof effects. Meanwhile, air between the double vibration diaphragms is removed to form a near-vacuum state, which greatly reduces background noise of the microphones, so that the MEMS microphones having the double vibration diaphragms have an unparalleled advantage in high-noise ratio MEMS microphones. However, in reliability test or daily use, sensitivity of the microphone is affected due to disadvantages of insufficient vibration diaphragm compliance.

SUMMARY

The present disclosure aims to provide a MEMS microphone to solve problems in the related art that sensitivity of microphones is affected due to disadvantages of insufficient compliance of vibration diaphragms.

The present disclosure provides a MEMS microphone, including a substrate, a vibration diaphragm system, and a housing. The substrate includes a back cavity, the vibration diaphragm system is disposed on one side of the substrate, and the housing is disposed to enclose the vibration diaphragm system and connected to the one side of the substrate, where the one side of the substrate is close to the vibration diaphragm system. The vibration diaphragm system includes a cross beam assembly and at least two sub-vibration diaphragm assemblies, the cross beam assembly is connected to the housing, the at least two sub-vibration diaphragm assemblies are connected to the cross beam assembly and are disposed at intervals, and a slit is formed between adjacent two of the at least two sub-vibration diaphragm assemblies. One end, distal from the housing, of each of the at least two sub-vibration diaphragm assemblies is fixed to the cross beam assembly, first gaps are formed between the at least two sub-vibration diaphragm assemblies and inner sides of the housing, and the at least two sub-vibration diaphragm assemblies are suspended on the one side of the substrate through the cross beam assembly and the housing.

As an improvement, the cross beam assembly includes a fixing member and cross beams. The fixing member is disposed in an enclosed area of the housing and the cross beams extend from a peripheral side of the fixing member and are fixed to the housing. The cross beams and the slit are in one-to-one correspondence, each of the cross beams is penetrated in a corresponding one of the slit, and the one end, distal from the housing, of each of the at least two sub-vibration diaphragm assemblies is fixed to the fixing member.

As an improvement, each of the at least two sub-vibration diaphragm assemblies includes a vibration diaphragm component and an insulating layer, the vibration diaphragm is connected to the fixing member, the insulating layer encloses the vibration diaphragm component. One end, distal from the housing, of the insulating layer is fixed to a position, close to the fixing member, of a corresponding one of the cross beams, and the slit is formed between a corresponding one of the insulating layer of a first one of the adjacent two of the at least two sub-vibration diaphragm assemblies and a corresponding one of the insulating layer of a second one of the adjacent two of the at least two sub-vibration diaphragm assemblies.

As an improvement, the cross beam assembly further includes fixing rings, each of fixing rings is connected between adjacent two of the cross beams and surrounds a corresponding one of the insulating layer, and second gaps are formed between the fixing rings and the housing.

As an improvement, the vibration diaphragm component includes a first vibration diaphragm, a back plate component, and a second vibration diaphragm, and the first vibration diaphragm, the back plate component, and the second vibration diaphragm are all connected to the fixing member. The first vibration diaphragm, the back plate component, and the second vibration diaphragm are sequentially disposed at intervals in a direction distal from the substrate. The fixing member, the insulating layer, the first vibration diaphragm, and the second vibration diaphragm enclose to form a low vacuum sealing space.

As an improvement, the back plate component includes a back plate, a first electrode, and a second electrode. The back plate is fixedly connected to the fixing member and the insulating layer, the first electrode is stacked on a first side, close to the substrate, of the back plate, and the second electrode is stacked on a second side, distal from the substrate, of the back plate.

As an improvement, the first vibration diaphragm and the second vibration diaphragm include wrinkles.

As an improvement, the vibration diaphragm component further includes supporting members, a first end of each of the supporting members is connected to the first vibration diaphragm, and a second end of each of the supporting members is connected to the second vibration diaphragm. The back plate component further includes a plurality of acoustic holes, the supporting members and the plurality of the acoustic holes are in one-to-one correspondence, and each of the supporting members penetrates through a corresponding one of the plurality of the acoustic holes.

As an improvement, the cross beams are disposed at intervals around an axis of the fixing member in an equal angle.

As an improvement, the insulating layer includes at least one of undoped polysilicon, SiN, or insulating materials.

Beneficial effects of the present disclosure are as following.

The present disclosure provides the MEMS microphone, including the substrate, the vibration diaphragm system, and the housing. The substrate includes the back cavity, the vibration diaphragm system is disposed on one side of the substrate, and the housing is disposed to enclose the vibration diaphragm system and connected to the one side of the substrate, where the one side of the substrate is close to the vibration diaphragm system. The vibration diaphragm system includes the cross beam assembly and the at least two sub-vibration diaphragm assemblies, the cross beam assembly is connected to the housing, the at least two sub-vibration diaphragm assemblies are connected to the cross beam assembly and are disposed at intervals, and the slit is formed between adjacent two of the at least two sub-vibration diaphragm assemblies. The one end, distal from the housing, of each of the at least two sub-vibration diaphragm assemblies is fixed to the cross beam assembly, the first gaps are formed between the at least two sub-vibration diaphragm assemblies and the inner sides of the housing, and the at least two sub-vibration diaphragm assemblies are suspended on the one side of the substrate through the cross beam assembly and the housing. The vibration diaphragm system includes the at least two sub-vibration diaphragm assemblies, the slit is formed between the adjacent two of the at least two sub-vibration diaphragm assemblies, the one end, distal from the housing, of each of the at least two sub-vibration diaphragm assemblies is fixed to the cross beam assembly, and the first gaps are formed between the at least two sub-vibration diaphragm assemblies and the inner sides of the housing, so that the at least two sub-vibration diaphragm assemblies form a cantilever beam structure, which increases compliance of the vibration diaphragm system and further improves the sensitivity of the microphones.

DETAILED DESCRIPTION OF EMBODIMENTS

The present disclosure is further described below with reference to the accompanying drawings and embodiments.

Figure 1:
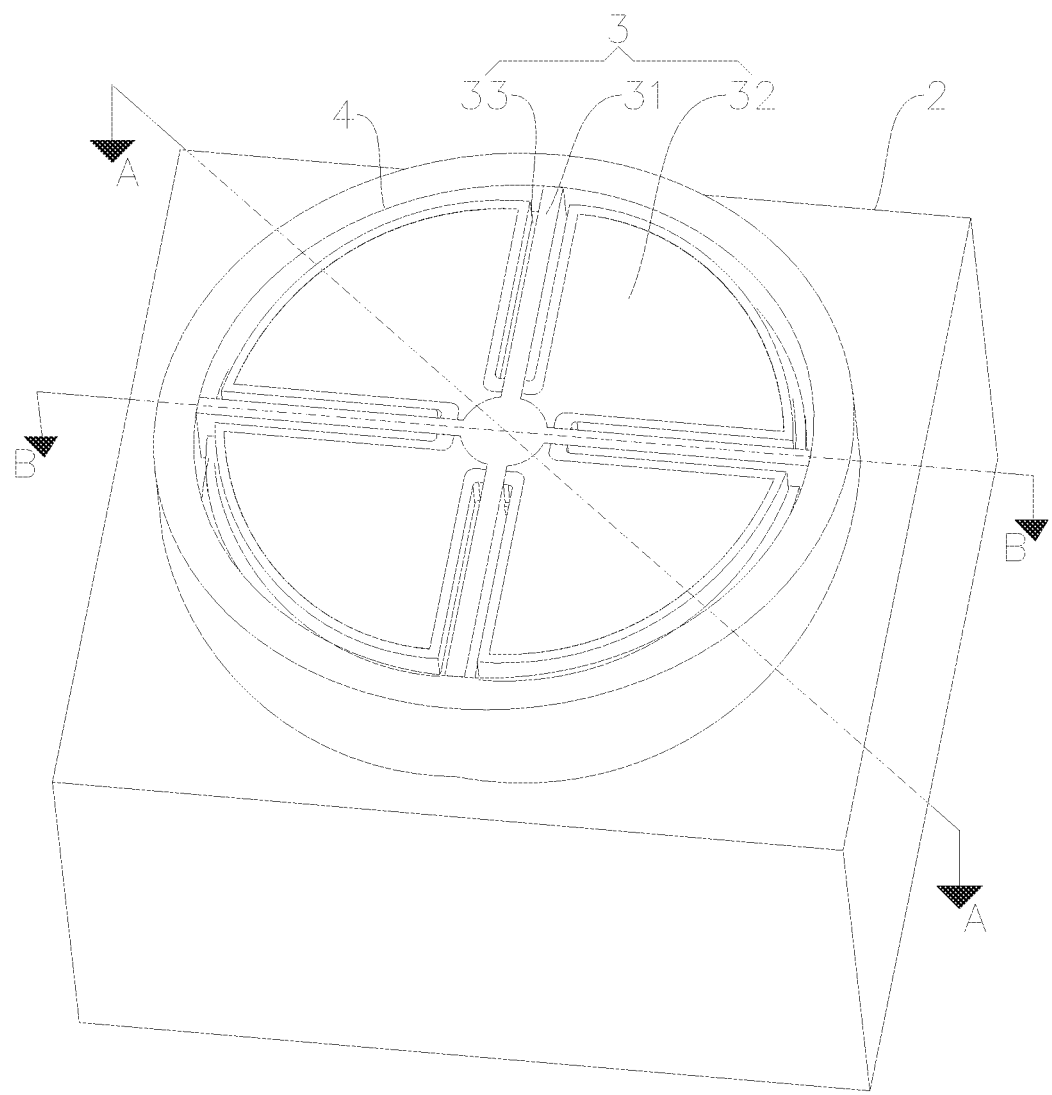
FIG. 1 is a structural schematic diagram of a MEMS microphone of the present disclosure.
Figure 2:
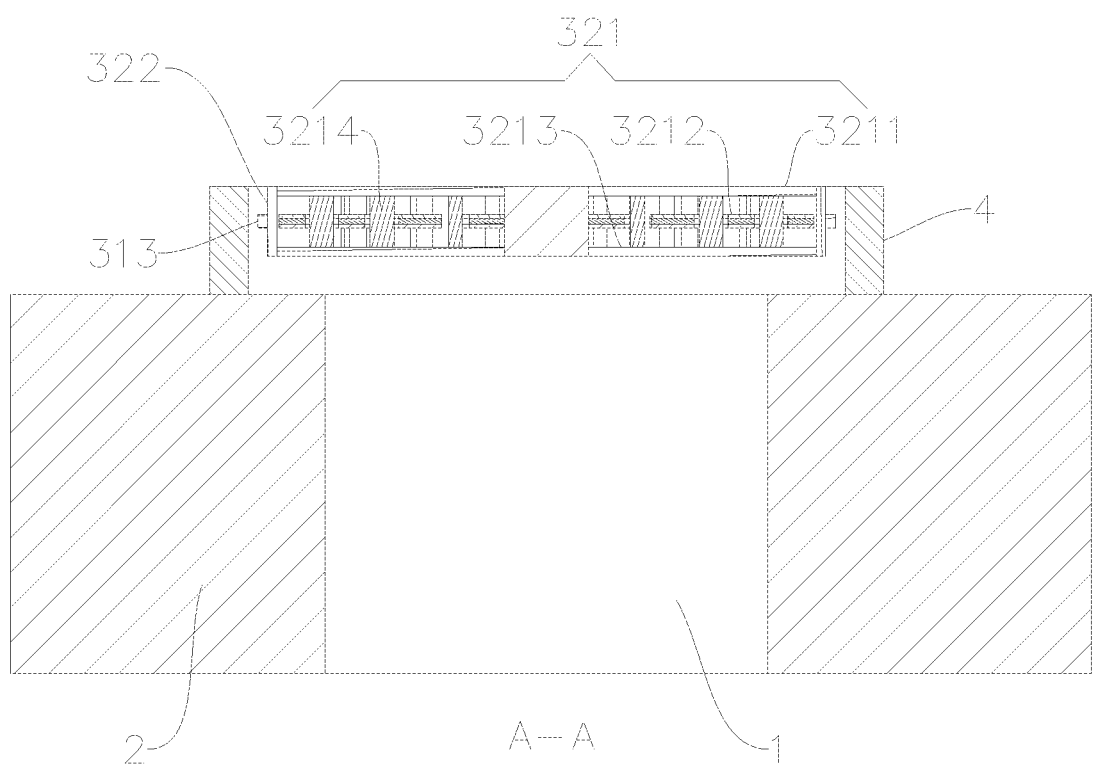
FIG. 2 is a cross-sectional schematic diagram taken along the line A-A shown in FIG. 1 of the present disclosure.
Figure 3:
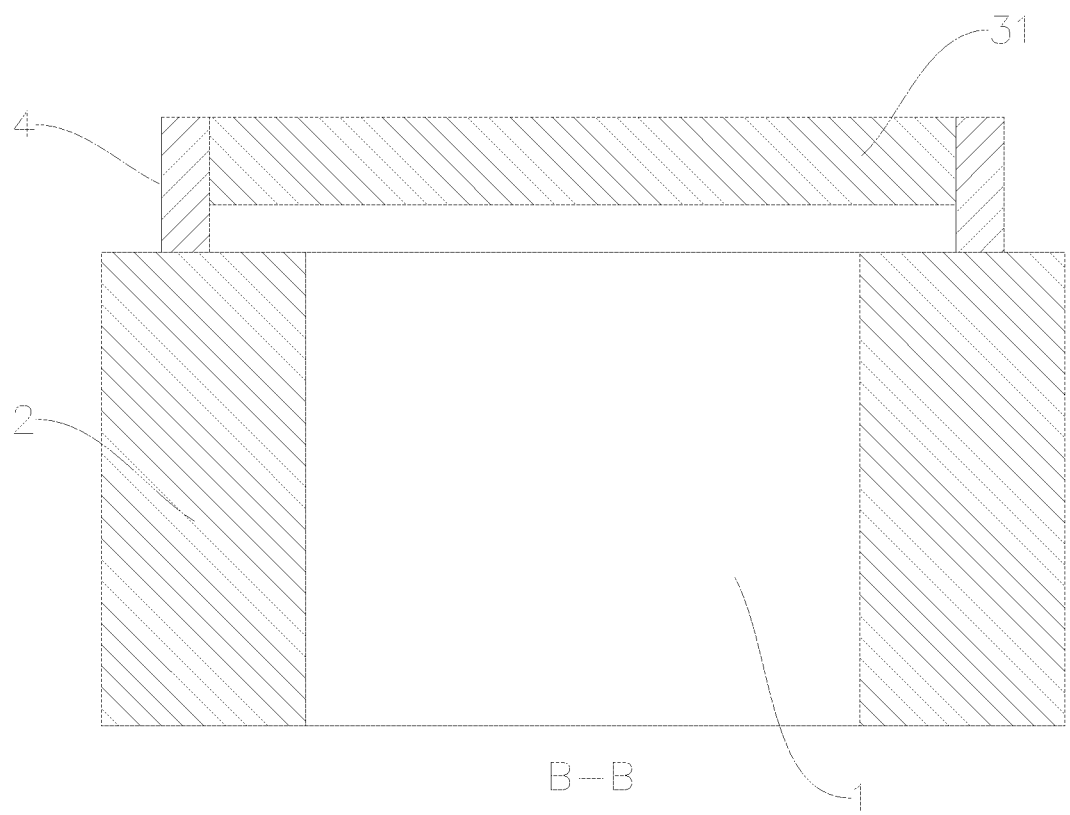
FIG. 3 is a cross-sectional schematic diagram taken along the line B-B shown in FIG. 1 of the present disclosure.
Figure 4:
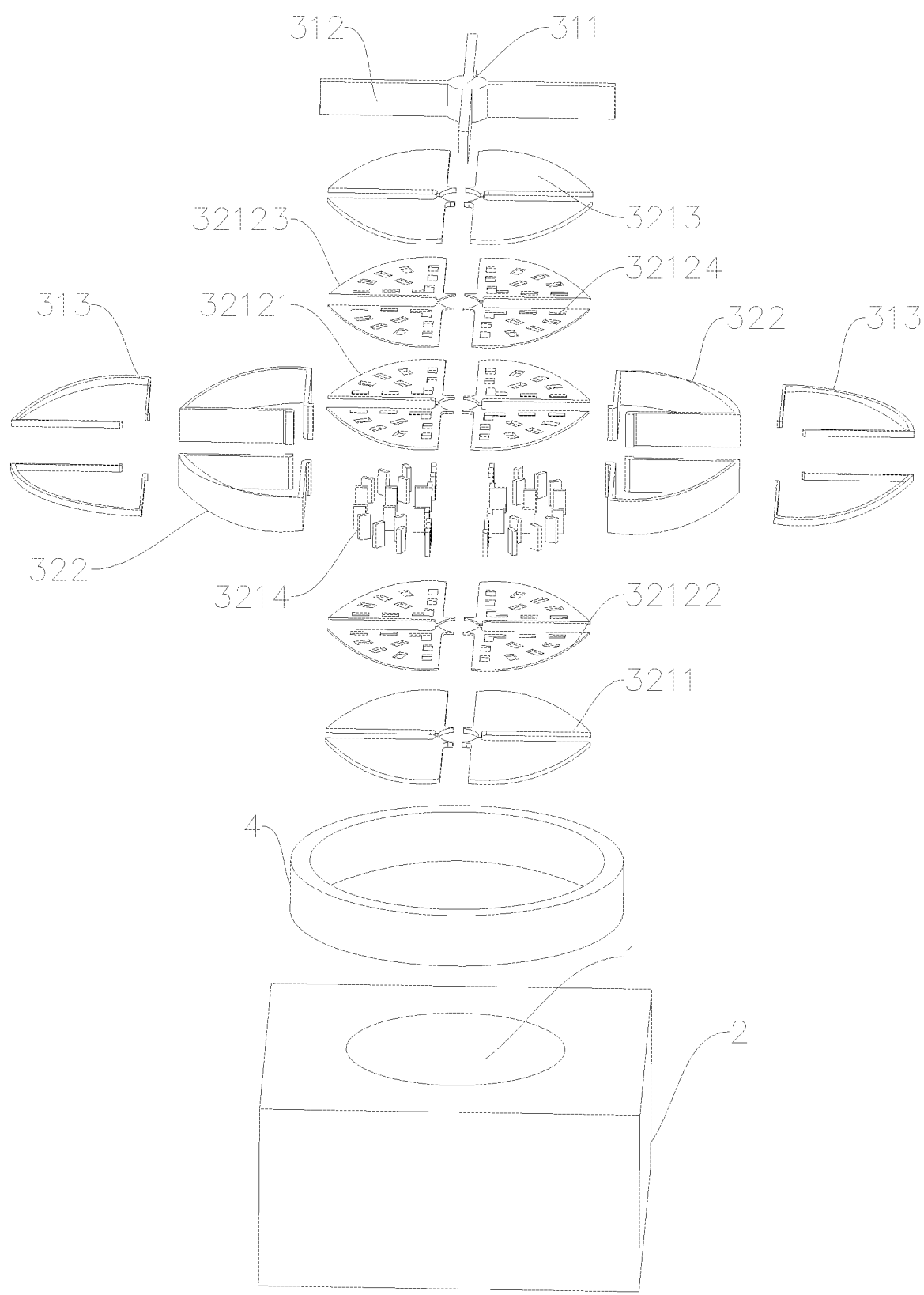
FIG. 4 is an exploded schematic diagram of the MEMS microphone of the present disclosure.

As shown in FIGS. 1-4, the present disclosure provides a MEMS microphone, including a substrate 2, a vibration diaphragm system, 3 and a housing 4. The substrate 2 includes a back cavity 1, the vibration diaphragm system 3 is disposed on one side of the substrate 2, and the housing 4 is disposed to enclose the vibration diaphragm system 3 and connected to the one side of the substrate 2, where the one side of the substrate 2 is close to the vibration diaphragm system 3. The vibration diaphragm system 3 includes a cross beam assembly 31 and at least two sub-vibration diaphragm assemblies 32, the cross beam assembly 31 is connected to the housing 4, the at least two sub-vibration diaphragm assemblies 32 are connected to the cross beam assembly 31 and are disposed at intervals, and a slit 33 is formed between adjacent two of the at least two sub-vibration diaphragm assemblies 32. One end, distal from the housing 4, of each of the at least two sub-vibration diaphragm assemblies 32 is fixed to the cross beam assembly 31, first gaps are formed between the at least two sub-vibration diaphragm assemblies 32 and inner sides of the housing 4, and the at least two sub-vibration diaphragm assemblies 32 are suspended on the one side of the substrate 2 through the cross beam assembly 31 and the housing 4.

In the embodiment, the housing 4 and the substrate 2 are connected for supporting, the cross beam assembly 31 is configured to fix the vibration diaphragm system 3 in the housing 4 and suspend the vibration diaphragm 3 on the one side of the substrate 2, where the one side of the substrate 2 is close to the vibration diaphragm 3. The slit 33 is communicated with the back cavity 1. Certainly, the slit 33 may also be not communicated with the back cavity 1. Further, a number of the slit 33 may be two or more than two. Optionally, a size of each of the slit 33 is equal, and certainly, sizes of a plurality of slits 33 may not be the same. The vibration diaphragm system 3 includes the at least two sub-vibration diaphragm assemblies 32, the slit 33 is formed between the adjacent two of the at least two sub-vibration diaphragm assemblies 32, the one end, distal from the housing 4, of each of the at least two sub-vibration diaphragm assemblies 32 is fixed to the cross beam assembly 31, and the first gaps are formed between the at least two sub-vibration diaphragm assemblies 32 and the inner sides of the housing 4, so that the at least two sub-vibration diaphragm assemblies 32 form a cantilever beam structure, which increases compliance of the vibration diaphragm system 3 and further improves sensitivity of microphones.

Furthermore, the cross beam assembly 31 includes a fixing member 311 and cross beams 312. The fixing member 311 is disposed in an enclosed area of the housing 4 and the cross beams 312 extend from a peripheral side of the fixing member 311 and are fixed to the housing 4. The cross beams 312 and the slit 33 are in one-to-one correspondence, each of the cross beams 312 is penetrated in a corresponding one of the slit 33, and the one end, distal from the housing 4, of each of the at least two sub-vibration diaphragm assemblies 32 is fixed to the fixing member 311. The cross beams 312 are disposed at intervals around an axis of the fixing member 311 in an equal angle.

In the embodiment, the fixing member 311 is disposed in the housing 4, the at least two sub-vibration diaphragm assemblies 32 surround the fixing member 311 and are disposed at intervals. The slit 33 is formed between the adjacent two of the at least two sub-vibration diaphragm assemblies 32, the cross beams 312 extend from the peripheral side of the fixing member 311 and are fixed to the housing 4, so that the at least two sub-vibration diaphragm assemblies 32 fixed to the fixing member 311 are suspended on the one side of the substrate 2, where the one side of the substrate 2 is close to the vibration diaphragm system 3. A first end of each of the at least two sub-vibration diaphragm assemblies 32 is fixed to the fixing member 311, and the first gaps formed between a second end of each of the at least two sub-vibration diaphragm assemblies 32 and the housing 4, so that the first end of each of the at least two sub-vibration diaphragm assemblies 32 is fixed, and the second end of each of the at least two sub-vibration diaphragm assemblies 32 vibrates up and down. It should be noted that the at least two sub-vibration diaphragm assemblies 32 may be fan-shaped, or triangular-shaped, or, certainly other shapes as required, and the shape of the at least two sub-vibration diaphragm assemblies 32 is not limited herein. The cross beams 312 may be multiple. Optionally, the cross beams 312 are disposed at intervals around the axis of the fixing member 311 in the equal angle and may certainly be disposed at intervals around the axis of the fixing member 311 in different angles. Optionally, width and thickness of each of the cross beams 312 are equal but may certainly unequal. The cross beams 312 are flush with the at least two sub-vibration diaphragm assemblies 32 in a thickness direction, and the at least two sub-vibration diaphragm assemblies 32 and the cross beam assembly 31 are flush on one side, distal from the substrate 2, of the housing 4. Certainly, as required, the cross beams 312 may not be flush with the at least two sub-vibration diaphragm assemblies 32 in the thickness direction and the at least two sub-vibration diaphragm assemblies 32 and the cross beam assembly 31 may not be flush on the one side, distal from the substrate 2, of the housing 4.

Furthermore, each of the at least two sub-vibration diaphragm assemblies 32 includes a vibration diaphragm component 321 and an insulating layer 322, the vibration diaphragm 321 is connected to the fixing member 311, the insulating layer 322 encloses the vibration diaphragm component 321. One end, distal from the housing 4, of the insulating layer 322 is fixed to a position, close to the fixing member 311, of a corresponding one of the cross beams 312, and the slit 33 is formed between a corresponding one of the insulating layer 322 of a first one of the adjacent two of the at least two sub-vibration diaphragm assemblies 32 and a corresponding one of the insulating layer 322 of a second one of the adjacent two of the at least two sub-vibration diaphragm assemblies 32. The insulating layer 322 includes at least one of undoped polysilicon, SiN, or insulating materials.

In the embodiment, the insulating layer 322 encloses the vibration diaphragm component 321 and forms a sealed space with the vibration diaphragm system 3, the one end, distal from the housing 4, of the insulating layer 322 is fixed to the position, close to the fixing member 311, of the corresponding one of the cross beams 312, so that the insulating layer 322 and the cross beams are spaced apart. Since a periphery side of the vibration diaphragm component 321 is supported by the insulating layer 322, a suspended area is reduced to avoid collapse and adhesion of the sealed space in the vibration diaphragm component 321, thereby improving sensitivity of the vibration diaphragm component 321.

In the embodiment, the cross beam assembly 31 further includes fixing rings 313, each of fixing rings 313 is connected between adjacent two of the cross beams 312 and surrounds a corresponding one of the insulating layer 322, and second gaps are formed between the fixing rings 313 and the housing 4.

In the embodiment, the fixing rings 313 surround the corresponding one of the insulating layer 322, so that the insulating layer 322 and the vibration diaphragm component 321 are better fixed to the cross beam assembly 31, and the second gaps are formed between the fixing rings 313 and the housing 4. Certainly, a shape of each of the fixing rings 313 is matched with a shape of the insulating layer 322, so that the thickness and height of the fixing rings 313 may be increased as required, thereby enhancing fixing capability of the fixing rings 313.

Furthermore, the vibration diaphragm component 321 includes a first vibration diaphragm 3211, a back plate component 3212, and a second vibration diaphragm 3213, and the first vibration diaphragm 3211, the back plate component 3212, and the second vibration diaphragm 3213 are all connected to the fixing member 311. The first vibration diaphragm 3211, the back plate component 3212, and the second vibration diaphragm 3213 are sequentially disposed at intervals in a direction distal from the substrate 2. The fixing member 311, the insulating layer 322, the first vibration diaphragm 3211, and the second vibration diaphragm 3213 enclose to form a low vacuum sealing space.

In the embodiment, a design of double vibration diaphragms is adopted, a middle layer is the back plate component 3212, and an upper layer and a lower layer are respectively the first vibration diaphragm 3211 and the second vibration diaphragm 3213, the first vibration diaphragm 3211 and the second vibration diaphragm 3213 are spaced apart to form a differential output with the back plate component 3212. The first vibration diaphragm 3211 and the second vibration diaphragm 3213 are sealed to form a sealing space between, when the sealing space is in a low vacuum state, noise between the first vibration diaphragm 3211, the second vibration diaphragm 3213, and the back plate component 3212 are reduced, so as to increase the compliance of the vibration diaphragm system 3. The first vibration diaphragm 3211, the second vibration diaphragm 3213, and the back plate component 3212 are fixedly connected to the fixing member 311 and the insulating layer 322. The first vibration diaphragm 3211, the second vibration diaphragm 3213, and the back plate component 3212 are not in contact in a floating portion, so as to avoid collapse and adhesion of the first vibration diaphragm 3211, the second vibration diaphragm 3213, and the back plate component 3212, thereby improving sensitivity of the first vibration diaphragm 3211 and the second vibration diaphragm 3213.

Furthermore, the back plate component 3212 includes a back plate 32121, a first electrode 32122, and a second electrode 32123. The back plate 32121 is fixedly connected to the fixing member 311 and the insulating layer 322, the first electrode 32122 is stacked on a first side, close to the substrate 2, of the back plate 32121, and the second electrode 32123 is stacked on a second side, distal from the substrate 2, of the back plate 32121. The vibration diaphragm component 321 further includes supporting members 3214, a first end of each of the supporting members 3214 is connected to the first vibration diaphragm 3211, and a second end of each of the supporting members 3214 is connected to the second vibration diaphragm 2313. The back plate component 3212 further includes a plurality of acoustic holes 32124, the supporting members 3214 and the plurality of the acoustic holes 32124 are in one-to-one correspondence, and each of the supporting members 3214 penetrates through a corresponding one of the plurality of the acoustic holes 32124.

In the embodiment, the plurality of the acoustic holes 32124 are defined on the first electrode 32122, the back plate 32121, and the second electrode 32123. A single overall shape of the plurality of the acoustic holes 32124 is polygonal, and in this embodiment, the plurality of the acoustic holes 32124 are in shapes of quadrangle and irregular pentagon. It should be noted that the plurality of the acoustic holes 32124 may be disposed in an array, or may be disposed in an irregular manner. The plurality of the acoustic holes 32124 are arranged to enable operation to be continued even if individual acoustic holes 32124 are damaged, thereby reducing effects on the microphones, and the supporting member 3214 are configured to support the first vibration diaphragm 3211 and the second vibration diaphragm 3213.

Furthermore, the first vibration diaphragm 3211 and the second vibration diaphragm 3213 include wrinkles.

In the embodiment, the first vibration diaphragm 3211 and the second vibration diaphragm 3213 are connected through the insulating layer 322 and form the wrinkles (not shown in the drawings) to increase compliance of the vibration diaphragms.

Based on above, the present disclosure provides the MEMS microphone, the vibration diaphragm system of which includes the at least two sub-vibration diaphragm assemblies, the slit is formed between the adjacent two of the at least two sub-vibration diaphragm assemblies, the one end, distal from the housing, of each of the at least two sub-vibration diaphragm assemblies is fixed to the cross beam assembly, and the first gaps are formed between the at least two sub-vibration diaphragm assemblies and the inner sides of the housing, so that the at least two sub-vibration diaphragm assemblies form the cantilever beam structure, which increases compliance of the vibration diaphragm system and further improves the sensitivity of the microphones.

The foregoing are merely embodiments of the present disclosure, and it should be noted that, for those who skilled in the art, improvements can be made without departing from the concepts of the present disclosure, but these are all within the protection scopes of the present disclosure.

What is claimed is:

1. A Micro-Electro-Mechanical System (MEMS) microphone, comprising:
   a substrate;
   a vibration diaphragm system; and
   a housing;
   wherein the substrate comprises a back cavity, the vibration diaphragm system is disposed on one side of the substrate, and the housing is disposed to enclose the vibration diaphragm system and connected to the one side of the substrate, where the one side of the substrate is close to the vibration diaphragm system; the vibration diaphragm system comprises a cross beam assembly and at least two sub-vibration diaphragm assemblies, the cross beam assembly is connected to the housing, the at least two sub-vibration diaphragm assemblies are connected to the cross beam assembly and are disposed at intervals, and a slit is formed between adjacent two of the at least two sub-vibration diaphragm assemblies; one end, distal from the housing, of each of the at least two sub-vibration diaphragm assemblies is fixed to the cross beam assembly, first gaps are formed between the at least two sub-vibration diaphragm assemblies and inner sides of the housing, and the at least two sub-vibration diaphragm assemblies are suspended on the one side of the substrate through the cross beam assembly and the housing;
   the cross beam assembly comprises a fixing member and cross beams; the fixing member is disposed in an enclosed area of the housing and the cross beams extend from a peripheral side of the fixing member and are fixed to the housing; the cross beams and the slit are in one-to-one correspondence, each of the cross beams is penetrated in a corresponding one of the slit, and the one end, distal from the housing, of each of the at least two sub-vibration diaphragm assemblies is fixed to the fixing member.

2. The MEMS microphone according to claim 1, wherein each of the at least two sub-vibration diaphragm assemblies comprises a vibration diaphragm component and an insulating layer, the vibration diaphragm is connected to the fixing member, and the insulating layer encloses the vibration diaphragm component; one end, distal from the housing, of the insulating layer is fixed to a position, close to the fixing member, of a corresponding one of the cross beams, and the slit is formed between a corresponding one of the insulating layer of a first one of the adjacent two of the at least two sub-vibration diaphragm assemblies and a corresponding one of the insulating layer of a second one of the adjacent two of the at least two sub-vibration diaphragm assemblies.

3. The MEMS microphone according to claim 2, wherein the cross beam assembly further comprises fixing rings, each of fixing rings is connected between adjacent two of the cross beams and surrounds a corresponding one of the insulating layer; and second gaps are formed between the fixing rings and the housing.

4. The MEMS microphone according to claim 2, wherein the vibration diaphragm component comprises a first vibration diaphragm, a back plate component, and a second vibration diaphragm, and the first vibration diaphragm, the back plate component, and the second vibration diaphragm are all connected to the fixing member; the first vibration diaphragm, the back plate component, and the second vibration diaphragm are sequentially disposed at intervals in a direction distal from the substrate; the fixing member, the insulating layer, the first vibration diaphragm, and the second vibration diaphragm enclose to form a low vacuum sealing space.

5. The MEMS microphone according to claim 4, wherein the back plate component comprises a back plate, a first electrode, and a second electrode; the back plate is fixedly connected to the fixing member and the insulating layer, the first electrode is stacked on a first side, close to the substrate, of the back plate, and the second electrode is stacked on a second side, distal from the substrate, of the back plate.

6. The MEMS microphone according to claim 4, wherein the first vibration diaphragm and the second vibration diaphragm comprise wrinkles.

7. The MEMS microphone according to claim 4, wherein the vibration diaphragm component further comprises supporting members, a first end of each of the supporting members is connected to the first vibration diaphragm, and a second end of each of the supporting members is connected to the second vibration diaphragm; the back plate component further comprises a plurality of acoustic holes, the supporting members and the plurality of the acoustic holes are in one-to-one correspondence, and each of the supporting members penetrates through a corresponding one of the plurality of the acoustic holes.

8. The MEMS microphone according to claim 1, wherein the cross beams are disposed at intervals around an axis of the fixing member in an equal angle.

9. The MEMS microphone according to claim 2, wherein the insulating layer comprises at least one of undoped polysilicon, SiN, or insulating materials.

* * * * *